US011589118B2

(12) United States Patent
Zelesko et al.

(10) Patent No.: US 11,589,118 B2
(45) Date of Patent: **\*Feb. 21, 2023**

(54) METHODS AND APPARATUS FOR ENHANCING NETWORK RELIABILITY AND/OR ENABLING PHASED DEPLOYMENT OF VIDEO SERVICES

(71) Applicant: Time Warner Cable Enterprises LLC, St. Louis, MO (US)

(72) Inventors: Matthew Zelesko, Doylestown, PA (US); James Manchester, New York, NY (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 418 days.

This patent is subject to a terminal disclaimer.

(21) Appl. No.: 16/154,619

(22) Filed: Oct. 8, 2018

(65) Prior Publication Data

US 2019/0045266 A1    Feb. 7, 2019

Related U.S. Application Data

(63) Continuation of application No. 15/494,483, filed on Apr. 22, 2017, now Pat. No. 10,097,891, which is a
(Continued)

(51) Int. Cl.
*H04N 21/462*      (2011.01)
*H04N 21/442*      (2011.01)
(Continued)

(52) U.S. Cl.
CPC ............ *H04N 21/4622* (2013.01); *H04N 21/43615* (2013.01); *H04N 21/44209* (2013.01); *H04N 21/44227* (2013.01); *H04N 21/6125* (2013.01)

(58) Field of Classification Search
CPC ........ H04N 21/4622; H04N 21/43615; H04N 21/44209; H04N 21/44227; H04N 21/6125
See application file for complete search history.

(56) References Cited

U.S. PATENT DOCUMENTS 8,661,472 B1 *    2/2014  Kardatzke .......... H04N 21/4821
                                                              725/48
2008/0313691 A1 * 12/2008  Cholas ................. H04N 21/438
                                                             725/131
(Continued)

*Primary Examiner* — Kunal Langhnoja
(74) *Attorney, Agent, or Firm* — Straub & Straub; Michael P. Straub; Stephen T. Straub

(57) ABSTRACT

Methods and apparatus for automatically transitioning program delivery/reception between alternative sources, e.g., from a non-IP channel to an IP video source or between two alternative IP sources are described. The transition maybe triggered by a detected problem with the delivery via the non-IP channel or because of scheduled service. The transition may be in response to a command sent to a device or because the receiving device detects a problem with one of the content sources triggering an automatic switch to the alternative content source. In at least some embodiments the different content sources corresponding to different coding methods, e.g., with MPEG-2 encoded and packetized content being delivered by a non-IP content delivery channel and MPEG-4 being delivered using unicast IP content delivery techniques. The methods facilitate deployment of new services with IP content delivery being deployed initially on a regional basis with non-IP content delivery gradually being rolled out.

26 Claims, 9 Drawing Sheets

Related U.S. Application Data continuation of application No. 13/956,206, filed on Jul. 31, 2013, now Pat. No. 9,648,387.

(51) Int. Cl.
*H04N 21/61* (2011.01)
*H04N 21/436* (2011.01)

(56) References Cited

U.S. PATENT DOCUMENTS

| | | | |
|---|---|---|---|
| 2009/0234965 A1* | 9/2009 | Viveganandhan | ............................ H04L 65/4092 709/231 |
| 2013/0219435 A1* | 8/2013 | Pattison | ............. H04N 21/6143 725/68 |

\* cited by examiner

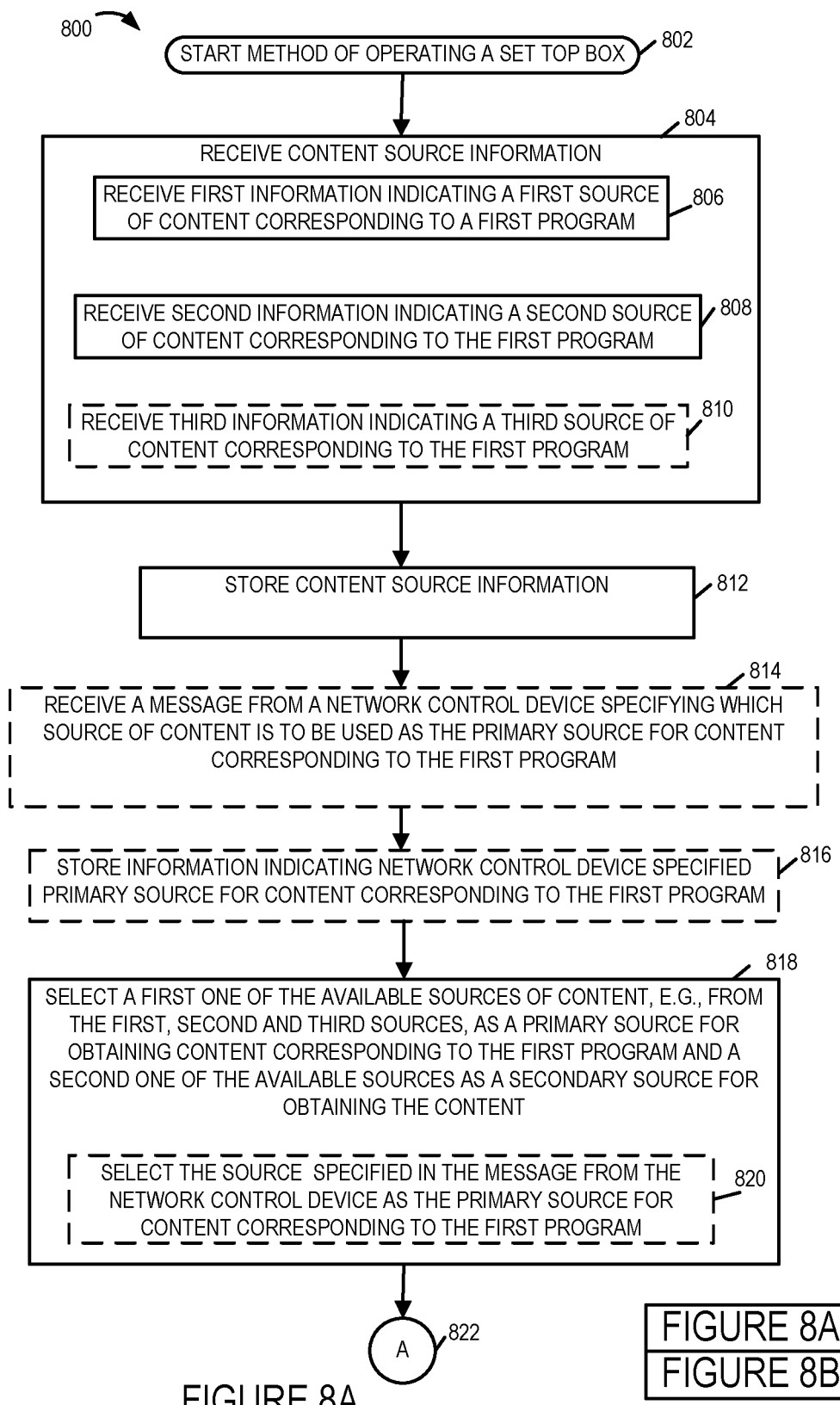

METHODS AND APPARATUS FOR ENHANCING NETWORK RELIABILITY AND/OR ENABLING PHASED DEPLOYMENT OF VIDEO SERVICES

RELATED APPLICATIONS

The present application is a continuation of U.S. patent application Ser. No. 15/494,483 filed on Apr. 22, 2017 which is a continuation of U.S. patent application Ser. No. 13/956,206 filed on Jul. 31, 2013 both of which are hereby expressly incorporated by reference in their entirety.

FIELD

The present invention relates to methods and apparatus relating to the use of a plurality of alternative content delivery methods and/or content sources to increase the reliability of content services and/or expedite the roll out of new services, e.g., video services.

BACKGROUND

The use of IP (Internet Protocol) devices on home networks such as those now commonly found in many customer premises, e.g., homes, offices, etc., is now relatively common place. At least some IP content delivery systems encode content using MPEG-4 encoding techniques and then packetize the content for delivery via IP packet streams. While IP content delivery is growing in importance, older systems such as cable network content delivery systems often rely on delivery of content via one or more channels corresponding to particular frequencies, with the content which is encoded via MPEG-2 or another coding format being communicated over the channel, e.g., using QAM (Quadrature Amplitude Modulation), without the use of IP packets. Such channels which use QAM modulation to deliver non-IP based content are sometimes referred to as QAM channels since they are used for content delivery via QAM modulation. While QAM may be used to communicate information in IP packets, IP based content delivery is normally identified by the use of IP packets and IP related protocols to deliver content and thus are often referred to as IP channels or IP streams. For purposes of this application a QAM channel, to the extent that the language is used, is intended to refer to a channel which does not use IP packets to deliver video or audio content and instead relies on a different content delivery format, e.g., an analog signal format or MPEG-2 packets.

In order to recover data communicated over a QAM channel, the QAM channel is tuned to and the data, e.g., VOD (Video On Demand) content, broadcast program content or switched digital video content, is recovered by demodulating and decoding the communicated content stream, e.g., an MPEG 2 video stream or other non-IP based content stream. While the content stream may be encoded digital video, e.g., MPEG-2 video and/or audio packets, to recover the QAM channels a device normally requires a tuner with a QAM demodulator. The tuner/demodulator circuitry required to tune to and recover capable broadcast channels and/or other network channels is normally lacking in devices which are intended to be solely IP based devices.

Accordingly, IP devices, e.g., cells phones, IP set top boxes, etc., coupled to a home network often can not directly access or obtain content from non-IP based cable network broadcast and video on demand channels due to the lack of a QAM tuner and/or direct access to a QAM channel, e.g., a cable channel, of the content delivery network, such as a cable network, which supplies content to a customer premise, e.g., residence. Thus, while IP devices such as IP TVs and IP playback devices can playback content streamed via an IP packet steam, e.g., a unicast packet stream to the end device, they are often unable to take advantage of the existing non-IP QAM content delivery channels which are often available for providing broadcast channels, VOD and/or other content on demand because of the lack of suitable tuner/demodulator hardware.

While IP based content delivery is growing in importance with many consumer products and even new set top boxes being IP devices without conventional cable tuners/demodulators the existing content delivery networks remain in place are cable of delivering large amounts of content often in a format, e.g., MPEG-2 format, which in many cases provides a comparable or better image quality than that provided by IP based content delivery streams using the more advanced MPEG-4 standard or similar codecs.

While the more advanced codecs such as MPEG-4 offer and support higher compression rates than MPEG-2 encoders, unicast IP based content delivery can place a heavy burden on network resources since each end user device is sent a separate stream as opposed to multiple devices accessing the same broadcast or switched digital video stream. Thus, while MPEG-4 can provide high data compression rates viewer image quality can suffer as compared to MPEG-2 based QAM channel delivery methods given that MPEG-4 IP content streams are often subject to bandwidth constraints and/or best effort traffic delivery constraints associated with many IP networks used to deliver such IP based content in order to manage the overall load on the IP based content delivery network.

Given the existing deployment of non-IP based content delivery systems including cable QAM channel delivery systems and their ability to deliver high quality content to a large number of users in a relatively efficient manner, many network operators continue to rely on non-IP based content delivery systems while adding functionality intended to support unicast IP content delivery to devices, e.g., cell phones and/or other IP devices, which can't take advantage of existing infrastructure.

Thus, it should be appreciated that cable networks and/or other providers of content using non-IP based content delivery techniques are likely to continue to support non-IP based content delivery given the large number of existing devices already deployed. In addition, such providers are likely to also supply at least some content via IP delivery based approaches.

Given the cost of upgrading to IP content delivery systems, service providers are likely to provide a mix of IP content delivery and non-IP content delivery, e.g., non-IP cable network delivery methods. Currently, such services are often treated as separate services. While IP content delivery and non-IP content delivery may be provided by the same service provider, e.g., cable operator, different hardware and resources are often used to supply the content being delivered. While both IP delivered content and non-IP delivered content may traverse portions of a delivery network, e.g., a cable network, at the point of egress to a customer premise, much of the hardware and content delivery path up until the customer premise may be separate and distinct. For example, while a customer may receive IP data including MPEG-4 encoded and IP packetized content via the same cable entering the customer's house which provides MPEG-2 broadcast content to a traditional cable set top box including a tuner/demodulator and MPEG-2 decoder, the servers and other devices in the network which supply the content to the cable for delivery to the customer premise are often different.

As the non-IP based delivery system of service providers ages it is likely to become less reliable and require increased amounts of service to replace faulty elements or elements reaching the end of their service life. Since non-IP based delivery systems such as transmitters and modulator are often regional in nature, replacement or failure of a component of a QAM content delivery network is likely to result in a localized failure affecting several households corresponding to a service region without necessarily affecting other non-IP based channels or services.

Given that IP based content delivery is often provided using different frequencies and hardware than that used to provide non-IP based channels, it would be desirable if devices and/or household which primarily rely on non-IP based channels for content delivery could take advantage of IP based content delivery in those periods of time and for those channels associated with hardware failures and/or service related outages relating to a non-IP based channel without overloading the IP content delivery system.

While service reliability is an important issue, there remains a need to continue to provide new services and/or program channels as customer expectations change over time. Because of the nature, e.g., broadcast servers and configuration set up requirements, of existing non-IP based content delivery systems and the relatively large size of regions service by non-IP based system it is often more labor intensive to roll out new services on non-IP based content delivery systems than it is on IP content servers where delivery of content to users can be configured relatively easily with straight forward policy rules and/or on a server serving a small number of customers. Thus, IP systems tend to be good platforms for trial of new services while in many cases non-IP content delivery is preferred in terms of a long term deployment when it is desirable to provide a service to a large number of users in a bandwidth efficient manner.

In addition to methods and apparatus for improving system reliability it would be desirable if methods and apparatus could be developed which would facilitate deployment of new services, where service could be provided to multiple users in various regions even if the non-IP based systems for providing services were not immediately available and/or ready to support the new service at the time of service deployment.

SUMMARY

Various features relate to improving a customer experience by supporting transitioning between alternative sources of content supplied to a user device, e.g., a customer premise device automatically transitioning between alternative content sources or in response to user input.

A device receiving content may automatically switch between the multiple available content sources either in response to a command received from a network device or on its own initiative, e.g., because of poor quality of the content being received or because of an interruption in the receipt of content. The device, e.g., set top box, switching from one content source to another may send a signal to a server in the network reporting the change and the reason for switching. Alternatively, the switch may be detected by a device in the network, e.g., by an IP content server which streams IP content in a unicast content stream in response to a request for content.

Detection of multiple devices switching from a QAM delivery channel to an alternative IP content delivery source may be indicative of a problem in hardware used in the delivery of content via the QAM channel. A server in the network headend may instruct other devices, e.g., set top boxes and/or other client devices to switch from using the QAM channel to IP content based delivery thereby avoiding possible interruptions to service corresponding to the same QAM channel equipment and/or hubs as the customer reporting QAM channel content delivery problems. Switch customers from the QAM channel to IP based content delivery also allows for servicing of the QAM content delivery hardware without interrupting viewing of a program or other piece of content whose delivery is switched to the IP content server.

While switching of QAM channel users may add an additional load to the IP server, since it is on a limited regional basis and may be limited to channels experiencing delivery issues but not all QAM channels, the switch can be implemented in many cases without placing an unduly heavy burden on the IP content server.

In various embodiments one of the sources is a non-IP based content source, e.g., a channel providing MPEG-2 encoded video data with at least one other source being a source of content communicated using IP packets.

The alternative sources may be different sources of a program or movie with each source providing the content but in a different format or using a communications path which is at least partially differs from the other source of the content.

In some embodiments, the two alternative sources may both be IP sources but with one being a local source, e.g., a gateway device located in the home through which content may be obtained via a URL supported by the gateway device where the gateway receives the content from a QAM channel and transcodes it for delivery over a local network using IP packets and the other source being a network IP content server which streams unicast IP content streams.

In various embodiments individual devices which use content from sources, e.g., individual set top boxes or user devices, store information regarding possible sources for content, e.g., programs. The devices obtain information indicating content which is available via QAM channel sources, local IP streaming devices such as a gateway device which may transcode content and supply it in IP packets, and content which is available from remote sources, e.g., IP content servers. The device, e.g., set top box, correlates the different available sources available to an individual program or movie. Thus for each possible piece of content the device may store information indicating a plurality of possible sources. The information may be stored in a program or content listing with the device selecting one source as a primary source and another source as a secondary source for the same content. While the content, e.g., program, may be the same, it may be and normally will be encoded differently depending on the source providing the content. In the case of a local content server being listed as a source, the original source may be, e.g., a QAM channel on which the content is received with the gateway device transcoding and repacketizing the content for delivery via the home network. Thus, in at least some embodiments a program guide is created from channel listing information, program guides and/or service information received by the individual set top boxes, gateways and/or user devices which may receive content with multiple sources being listed for an individual program.

In response to detecting a quality problem, failure to receive an expected content stream or a command from a device in a communications network, a set to box or other device may switch from a first content source to a second content source during program reception with the program being received, decoded and output from the point at which the switch is being made. Thus a relatively transparent transition may be made from a user, e.g., viewer's, perspective with the output continuing from the place in a program where the transition was triggered.

In many embodiments a non-IP content source is preferred over a unicast IP content source when it can be supported by the set top box or other device. This approach reduces the load on the network by avoiding the need for multiple unicast content delivery streams when the content can be obtained from a QAM cable channel. However, by supporting a switch to an IP content stream in the case of network problems or content quality issues, greater reliability can be achieved than without such a switchover being supported.

In addition, since the switchover can be triggered via the network prior to network service or in response to devices in a particular area indicating a problem, in many cases the switchover can be performed in a manner that is completely transparent to an end user. After a network problem is fixed, e.g., a faulty network element is replaced or serviced, a command may be issued by a network server to switch back from the secondary content delivery source to the primary content delivery source or to change which of the sources is considered the primary and secondary sources. Thus, network resources can be used in an efficient manner and interruptions of service to customers can be minimized even during replacement of system components.

Thus, it should be appreciated the present application describes methods and apparatus for automatically transitioning program delivery/reception between alternative sources, e.g., from a first source such as a non-IP channel such as a QAM cable broadcast channel or SDV channel to second source such as an IP video streaming source. The transition may be triggered by a detected problem with the delivery via the non-IP channel or because of scheduled service. The transition may be in response to a command sent to a device or because the receiving device detects a problem with one of the content sources triggering an automatic switch to the alternative content source. In at least some embodiments the different content sources correspond to different coding methods, e.g., with MPEG-2 encoded and packetized content being delivered by a non-IP content delivery channel and MPEG-4 being delivered using unicast IP content delivery techniques.

While the methods and apparatus described herein facilitate improvements in reliability from a customer's perspective by allowing a user to view the end of a program when a content delivery issue precludes continued delivery from a broadcast or other non-IP source, the methods can also be used to facilitate roll out of new services.

In accordance with some embodiments services are initially provided on regional basis with an IP content source being configured as the primary source and a secondary source being nil (unavailable). As a service roll out proceeds QAM content delivery channels may be configured for the new service. Devices in which the QAM channel or channels for the service become available are instructed to use the QAM channel or channels as the primary source and the IP source as a secondary source. Over time devices relying on the IP source will be transitioned to QAM based deliver sources as the QAM channel, e.g., broadcast channel, is provisioned in various regions. In this manner, as service can be rolled out over a large area even if there has not been time to configure non-IP QAM channel delivery equipment to support the service in some regions at the time of service deployment. Users are relatively unaffected by the transition between the content sources making the users unaware of how the service is being provided in many cases or the transitional nature of the deployment which over time will be supported by both the QAM content delivery system and the IP content delivery system but with full duplication or availability taking a period of time to achieve.

Thus, at least in some embodiments the methods facilitate deployment of new services with IP content delivery being deployed initially on a regional basis with non-IP content delivery gradually being rolled out.

The methods and apparatus of the present invention are not limited to cable systems and can be used in systems which support multiple content delivery options where one is a broadcast delivery method and another is an on-demand IP based content delivery method.

For example, some users may have a satellite system for receiving video content and also have a land based fiber or cable connection to supplement the satellite system for data services and/or video on-demand services. In the event of loss of satellite reception due to rain or other weather related conditions, the set top box may temporarily switch to an IP based content source using the secondary connection.

While various exemplary embodiments and features have been described, numerous additional features and embodiments are described in the detailed description which follows.

DETAILED DESCRIPTION

Figure 1:
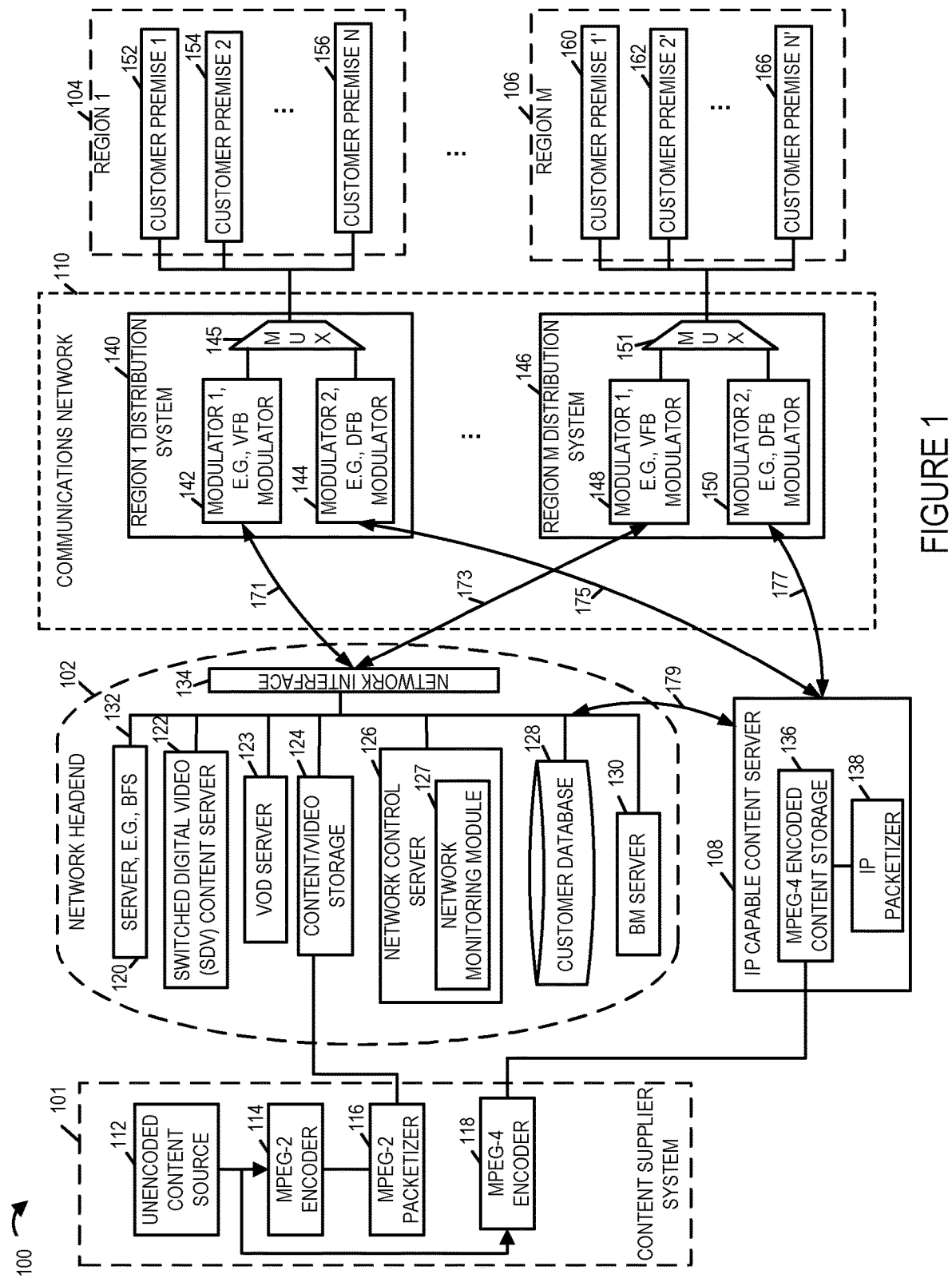
FIG. 1 illustrates an exemplary system implemented in accordance with some embodiments of the present invention.

FIG. 1 illustrates an exemplary system 100 implemented in accordance with one exemplary embodiment of the invention. System 100 supports delivery of content to customer premise equipment (CPEs), e.g., set top boxes, internet protocol (IP) capable TVs, computers, tablets, mobile phones, etc. The exemplary system includes one or more subsystems which may be physically located at different locations. The one or more subsystems shown in the system 100 communicate and/or exchange information over one or more communications network, e.g., cable network, Internet etc.

The system 100 includes a content supplier system 101, a network headend 102, a communications network 110, e.g., including a hybrid fiber-coaxial (HFC) network and/or internet, an IP capable content server 108, and a plurality of regions 104, 106 with customer premises that are served by the headend 102. The headend 102 may be a system located at a cable office or other location including the components shown in FIG. 1. In various embodiments the content, e.g., multimedia content, is delivered from the headend 102 and/or IP content server 108 over the communications network 110 to one or more CPEs in the customer premises 104, 106. While the content delivered from the BFS 120 or SDV server 122, VOD server 122 may be supplied to a customer premise and traverse the same cable at the entry to the customer premise, different equipment and/or network links may be used for at least a portion of the path to an individual customer premise with regard to content being supplied by different servers. This provides an opportunity to enhance network resiliency in at least some embodiments by supporting the switching to, e.g., the IP content server 108 in the event of a problem with in a particular region or with a particular piece of hardware used to support distribution of a cable QAM channel, e.g., a BFS channel, to a particular region or household.

The content supplier system 101 supplies content, e.g., movies and/or other programming content, to a plurality of regional distribution systems including service provider's network headend 102 and one or more IP content servers such as the IP capable content server 108. The IP capable content server 108 is capable of streaming content in unicast streams in an MPEG-4 encoded format, or another advanced coding format, with the encoded data being sent in IP packets. The BFS and other servers in the headend 102 are well suited for supplying content, e.g., MPEG-2 encoded and MPEG-2 packetized content in a non-IP format to devices with a tuner and demodulator allowing them to receive, demodulate and decode such content. The MPEG-2 content delivery system, e.g., broadcast or SDV and even QAM based VOD, is efficient in that the same content may be broadcast and/or delivered to multiple systems on a single channel without the need to transmit a separate unicast stream to each set top box or user device which may desire to receive the content. The IP capable content server 108 on the other hand supports unicast content delivery. This is particularly well suited for IP capable devices such as cell phones, and IP TVs where on demand streaming of content is desired but can be taxing on overall system resources as each unicast steam requires bandwidth without the advantage of the IP unicast stream supporting or being shared by multiple devices in most cases. Accordingly, from a bandwidth perspective, providing services via the network headend and non-IP QAM modulated cable channels can be desirable. However, to support at least some IP devices both delivery methods are supported for a large portion of content, e.g., TV programs and/or movies which may be delivered.

In FIG. 1, the regions 104 through 106 that correspond to and are served by the network headend 102 are shown as an example. It should be appreciated that a single network headend 102 that may correspond to, e.g., a first region, and a single IP capable content server 108 are shown for illustration purposes, however the system 100 may, and in some embodiments does, include a plurality of network headends corresponding to different regions and more than one IP content server 108.

The content supplier system 101 includes an unencoded content source 112, an MPEG-2 encoder 114, an MPEG-2 packetizer 116 and an MPEG-4 encoder 118. The unencoded content source supplies content, e.g., movies, TV programs and/or other programming information, in unencoded form to the different encoders in the content supplier system 101 as illustrated. As the name suggests, the MPEG-2 encoder 114 encodes programming content in an MPEG-2 compliant format while the MPEG-4 encoder 118 encodes programming content in an MPEG-4 compliant format. The MPEG-2 packetizer 116 packetizes, e.g., generates packets corresponding to the encoded programming content received from the MPEG-2 encoder and supplies the packetized content to the headend 102. The MPEG-4 encoder supplies the MPEG-4 compliant encoded content to the IP capable content server 108.

The network headend 102 provides services, e.g., content delivery services, via the communications network 110 to the customer premises which correspond to the regions 104, 106 serviced by the headend 102. The headend 102 may be implemented at a cable network office or hubsite serving a plurality of customer premises and includes multiple servers and databases which are coupled together as shown. In the FIG. 1 embodiment, the headend 102 includes a content server, e.g., a broadcast file server (BFS) 120, a switched digital video (SDV) content server 122, a video on-demand (VOD) server 123, a content storage 124, a network control server 126, a customer database 128 and a business management server 148. It should be appreciated that various servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a local network 132. The local network 132 is coupled via one or more network interfaces 134 to other networks and/or devices. For example, the headend 102 is coupled via network interface 134 to communications network 110 and may also be coupled to one or more other external networks. In some embodiments system 100 may also include one or more mobile network(s) including one or more base stations (BS) for supporting communications, e.g., delivery of content and/or other signaling, with mobile devices such as cell phones.

The content server 120, e.g., a broadcast file server (BFS), among other things, is responsible for communicating, e.g., broadcasting, programming content and/or other information for delivery to one or more content playback devices at the customer premises in regions 104, 106. The switched digital video (SDV) content server 122 provides digital programming content to one or more content playback devices which support receiving SDV content while the VOD server 123 is responsible delivering video on-demand content ordered by one or more customers. In various embodiments the content servers 120, 122, 123 access the programming content from the content storage 124 and generate transport streams suitable for delivery to various CP devices via the communications network 110. The content storage 124 stores content, e.g., audio, video and/or other multimedia content received from the packetizer 116 in the content supplier system 101, e.g., packetized encoded MPEG-2 content.

The network control server 126 is configured to monitor the network to ensure proper delivery of content to customer premises and determine if a problem occurs in content delivery, e.g., due to network congestion, fault in a network element and/or other issues. The network control server 126 may, and in some embodiments does, receive messages from customer premise devices, e.g., set top boxes, which decide to switch between available content sources due to quality or content delivery problems. In some embodiments the control server 126 uses this information to identify customer premise devices having delivery equipment in common with the device switching to the alternate content delivery source and may proceed to instruct one or of such devices to switch to the alternative, e.g., secondary, content delivery source prior to encountering a problem on a particular channel or program.

Thus, in various embodiments the network control server 126 is configured to control, e.g., by instructing, a customer playback device, e.g., a set top box or other device, to switch from receiving program content from a first content source to a second content source. In accordance with one feature of some embodiments, the network controller 126 commands one or more devices to perform such a change of content when a problem, fault or network congestion is detected. In some other embodiments this may be done without any network congestion and/or equipment fault, e.g., when service of equipment is scheduled which may interfere with delivery from a particular content source or as part of provisioning a new service where the service may be initially provided to some devices via the cable content server 108 but with those devices being switched to use content from one of the servers 120, 122 in the headend once they are provisioned to provide the service.

The network control server 126 instructs devices such as set top boxes and gateway devices which devices they are to use as a primary content source for a program when possible and which content source or sauces should be used as a backup source, e.g., as a secondary or even third source in some embodiments. The primary/secondary content source information may be provided on a per program or per piece of content basis. Alternatively it may be indicated as a general instruction to use the BFS 120 or SDV server 122 as the content source whenever possible, or a transcoded version of such content generated by a gateway device at the customer premise whenever possible rather than the IP capable content server 108.

The customer database 128 includes, for a plurality of customers, customer information, account information and information regarding the devices installed at customer premises. In some embodiments customer account information includes, e.g., customer account number, customer subscription/service information, customer device capability and other billing related information. Customer database 128 also includes customer device information, e.g., identification and/or other information regarding customer devices such as video gateways, STBs, cable modems etc., installed at various customer premises served by the headend 102. BM (Business management) server 130 processes billing information corresponding to customers serviced by the headend 102. This may include updating billing charge information in response to changes in services being provided to the customer, upgrades, on-demand content purchases, and/or other activity. Business management server 130 also processes services bill payment information, e.g., bill payment transactions, deductions from debit accounts, mail bills, and/or processes discount and/or other information.

In various embodiments the IP capable content server 108 supplies unicast IP program content streams to various IP capable content playback devices at customer premises in the regions 104, 106 served by the IP content server 108. The IP content server 108 includes an MPEG-4 encoded content storage 136 which receives encoded content from the MPEG-4 encoder 118, and an IP packetizer 138 that packetizes, e.g., generates packets corresponding to the MPEG-4 encoded programming content and supplies the packetized content to various IP capable devices in the customer premises in region 104, 106.

As shown in FIG. 1, communications links 171, 173 traversing the communications network 110 couple the customer premise equipments (CPEs) at customer premises in region 1 104 and in region M 106 respectively to the various elements/servers shown in the network headend 102 while the links 175, 177 couple the customer premise equipments (CPEs) at customer premises in region 1 104 and in region M 106 to the IP content server 108. A communications link 179 couples the IP content server 108 to the headend 102 over which information can be exchanged.

Via the communications network 110, the IP content server 108 and the elements shown in the network headend 102 can send and/or exchange various information with the devices located at the customer premises in regions 104, 106. Communications network 110 includes a plurality of regional distribution system including region 1 distribution system 140 through region M distribution system 146. Region 1 distribution system 140 includes a first modulator 142, e.g., a video frequency band (VFB) modulator, a second modulator 144, e.g., a data frequency band (DFB) modulator and a multiplexer (MUX) 145. Similarly Region M distribution system 146 includes a modulator 148, e.g., a video frequency band (VFB) modulator, a second modulator 150, e.g., a data frequency band (DFB) modulator and a multiplexer (MUX) 151.

Region 1 104 includes customer premise 1 152 through N 156 while Region M 106 includes customer premise 1' 160 through N' 166 corresponding to customers served by headend 102. Each customer premise 152, 154, . . . , 156 in region 1 and customer premise 160, 162, . . . , 166 in region N 106 may include a plurality of customer premise equipments (CPEs), e.g., devices including content playback devices. In various embodiments the CPEs located at the customer premises include, e.g., gateways, modems, routers, and content playback devices including, e.g., set top box, internet protocol devices, internet protocol capable TVs, personal computers, mobile devices such as laptops, tablet devices such as iPads, smart phones such as iPhones, etc.

Figure 2:
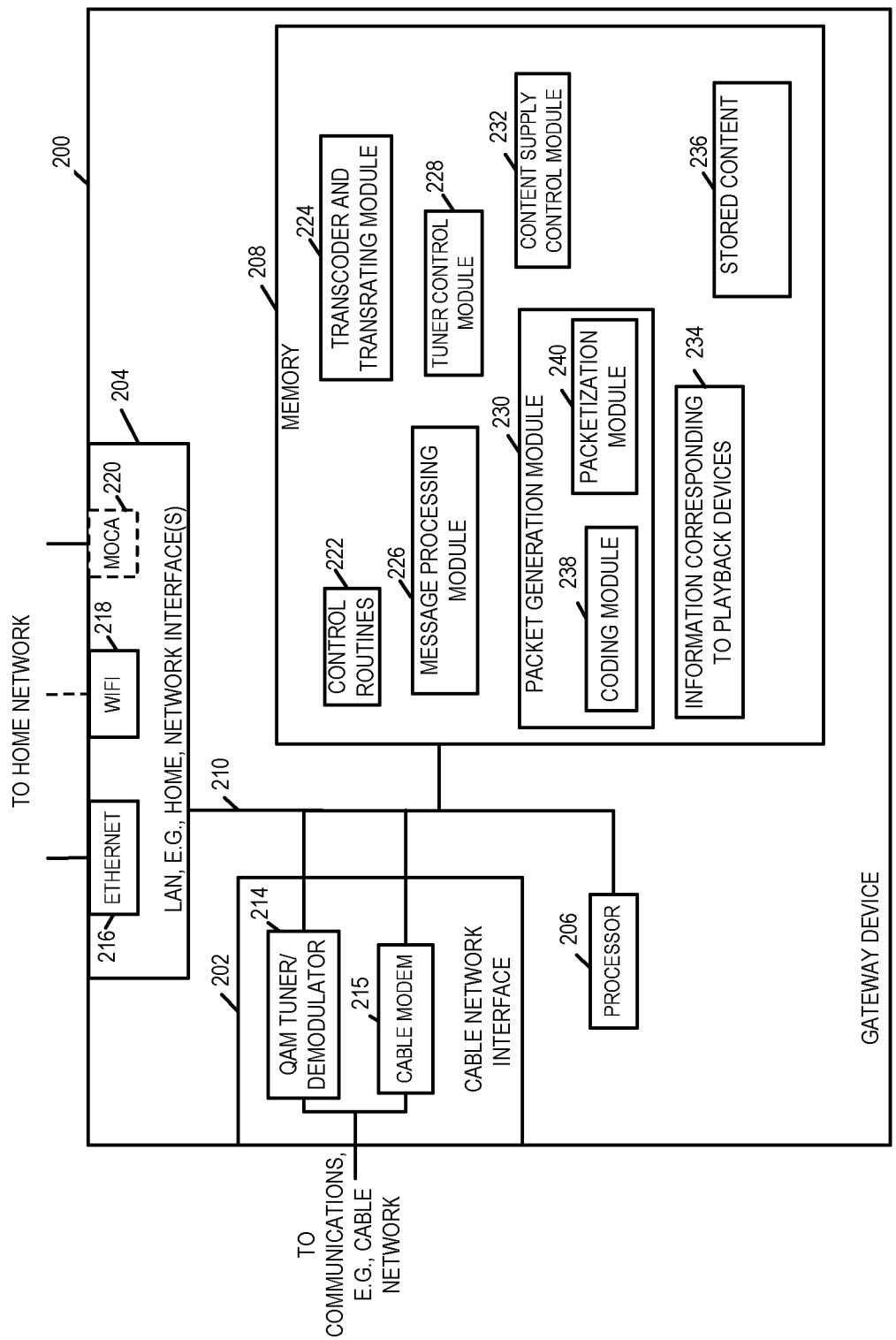
FIG. 2 illustrates an exemplary gateway communications device implemented in accordance with some exemplary embodiments.

FIG. 2 illustrates an exemplary gateway communications device 200 and various elements of the gateway device in greater detail. The exemplary gateway communications device 200 can be, and in some embodiments is, used in the various customer premises shown in FIG. 1. For the purpose of discussion consider that the gateway device 200 is located at a customer premise including a plurality of playback devices including set top boxes which normally receive content from the content servers in the headend 102, and IP capable playback devices which receive content via unicast IP streams from the IP content server 108.

In various embodiments the exemplary gateway device 200 receives programming content from the headend 102, e.g., via a QAM broadcast channel, VOD and/or SDV content delivery channel, from the content servers in the headend 102. In accordance with the features of some embodiments the gateway device 200 generates delivers at least a portion of the programming content to one or more playback devices collocated at the customer premise, e.g., over a local home network. In some embodiments the gateway device 200 is configured to perform transcoding and/or transrating operation prior to delivering the programming content to playback devices. In some embodiments as part of the process the gateway device demodulates and/or decodes the received program content and then re-encodes and packetizes the content. The content may be re-encoded based on the destination playback device with different playback devices receiving content which is coded differently, e.g., based on the codecs they support and/or the bandwidth, data rates etc., they can support.

As shown, the gateway device 200 includes a cable network interface 202, a local area network (LAN) interface 204, a processor 206, and a storage device, e.g. a memory 208, coupled together via a bus 210. The various elements of the gateway device 200 can exchange data and information over the bus 210.

The cable network interface 202 includes one or more tuner/demodulator pairs including QAM tuner/demodulator 214, and a cable modem, e.g., a DOCSIS modem. Via the interface 202, the gateway device 200 can exchange signals and/or information with other devices and/or system elements such as the servers in the network headend 102, over the communications network 110. The cable network interface 202 supports the receipt and/or transmission of content, and/or other information from/to different servers, e.g., the BFS, VOD server, SDV server, etc. In various embodiments the cable network interface 202 includes a receiver and a transmitter to receive and transmit content respectively, over the communications network 110. The QAM tuner-demodulator 214 is capable of tuning to a frequency band to receive programming content and demodulating the received content and/or information. The tuner/demodulator 214 works under the control of processor 206 and the tuner control module 228. In the illustrated embodiment the gateway device 200 includes a cable DOCSIS 215 that enables receiving programming content via IP streams from the IP content server 108 which can then be stored, processed and/or supplied to one or more set top boxes or IP devices, e.g., via the home network. In some embodiments the gateway does not the cable modem 215. Thus it should be appreciated that a variety of implementations are possible and a wide variety of content playback devices can be supported by the gateway 200.

Via the LAN interface 204, e.g., home network interface, the gateway device 200 can exchange signals and/or information with other various customer premise equipments such as, e.g., the content playback devices collocated at a customer premise, via the local network, e.g., home network. The LAN interface 204 supports the receipt and/or transmission of content, and/or other information over the home network from/to the various custom premise equipments. In some embodiments the home network may be, e.g., Ethernet, WiFi, MoCA (Multimedia over Coax). The LAN interface 204 includes an Ethernet interface 216, an integrated WiFi modem 218 and an optional MoCA interface 220.

The processor 206, e.g., a CPU, executes routines 222 and one or more modules and controls the gateway device 200 to operate in accordance with the invention. The processor 206 is responsible for controlling the general operation of the gateway device 200. Thus to control the gateway device 200, the processor 206 uses information, various modules and/or routines including instructions stored in memory 208.

In addition to the routines 222, the memory 208 includes a transcoding and transrating module 224, a message processing module 226, a tuner control module 228, a packet generation module 230, content supply control module 232, information corresponding to playback devices 234, and stored content 236.

Routines 222 include communications routines and/or device control routines. In some embodiments the gateway device 200 needs to perform transcoding and transrating operation on the program content, prior to supplying the program content to a content playback device, so that the content is in a format (e.g., encoding and/or data rate) that is supported by the receiving playback device. The transcoding and transrating module 224 is configured to perform transcoding and transrating operation on program content in accordance with the invention.

The message processing module 224 is configured to process various messages and/or signals received by the gateway device 200. The received messages and/or signals include messages, instructions and/or other signals received from headend 102 and from the content playback devices, e.g., STBs. For example in some embodiments the message processing module 224 receives a message from the network control server 126 in the headend 102 to tune to a given channel to start receiving program content and supply at least a portion of the received program content to one or more playback devices located at the customer premise where gateway 200 is located. The gateway device 200 processes the received messages and provides information to the processor 206 and/or one or more other modules to take further action in response to the received messages.

The tuner control module 228 controls the tuner-demodulator 214 by providing them with information and/or parameters needed to tune to a given channel, e.g., one of a QAM broadcast channel, SDV delivery channel, or VOD delivery channel, to receive program content at a given time. In some embodiments the tuner control module 228 receives tuning information and/or other parameters from the message processing module 226 which receives and processes messages from the headend 102 including tuning information. The tuning information and/or other parameters are then used by the tuner control module 228 to control the operation of the tuner-demodulator.

The packet generation module 230 is responsible for generating unicast packets from the received program content. In various embodiments the packet generation module 230 includes a coding module 238 and a packetization module 240. The coding module 238 is configured to encode the program content according the coding standards supported by the content playback devices to which the generated unicast packets are to be provided. For example, if the gateway device 200 is to supply program content to a first playback device which supports a first coding standard and to a second playback device which supports a second coding standard, the coding module 238 will encode the content to be provided to the first playback device in accordance with the first coding standard while encoding the content to be provided to the second playback device in accordance with the second coding standard. The information regarding the playback devices including information about supported coding standards, data rates, physical device addresses etc., corresponding to the playback devices at the customer premise where gateway 200 is located is obtained by the gateway device 200 and stored as information 234 in the memory. The packetization module 240 is configured to packetize the content encoded by the coding module 238 in accordance with the coding standard supported by the playback device to which the packets are to be transmitted.

The content supply control module 232 controls the supply of program content to the content playback devices over the local, e.g., home, network via the LAN interface 204. The content supply control module 232 controls a transmission of at least some of the generated unicast packets to one or more playback devices via the LAN interface 204. For example, if a first set of unicast packets is generated for a first playback device and a second set of unicast packets is generated for a second playback device, the content supply module 232 controls transmissions of at least some of the first set of unicast packets to the first playback device and at least some of the second set of unicast packets to the second playback device over the home network.

The content storage 236 includes one or more buffers for storing program content. In some embodiments the one or more buffers are used for storing the program content received via the cable network 202 over one of the QAM broadcast program channel, SDV content delivery channel or a VOD content delivery channel.

In some embodiments, the gateway device 200 and other CPE devices support DLNA and/or are DLNA compliant devices. In some embodiments the gateway device 200 is a DOCSIS 3.0 compatible gateway device which includes a DSG (DOCSIS Set-top Gateway) agent and which serves as a CMTS (cable modem termination system). While shown in the customer premise the home network gateway 108 may, and in some embodiments is, located outside the customer premise, e.g., at a hubsite, which serves the customer premise. However, in most embodiments the gateway device 200 is a residential gateway located at the customer premise site, e.g., in the home of user, to which the set top boxes and the other CPE devices serviced by the residential home network gateway 108 correspond. In various embodiments, an Ethernet is often used for the home network although coax, wireless (e.g., WiFi) and/or other types of home networks and/or network interfaces can be and are supported in some embodiments.

Figure 3:
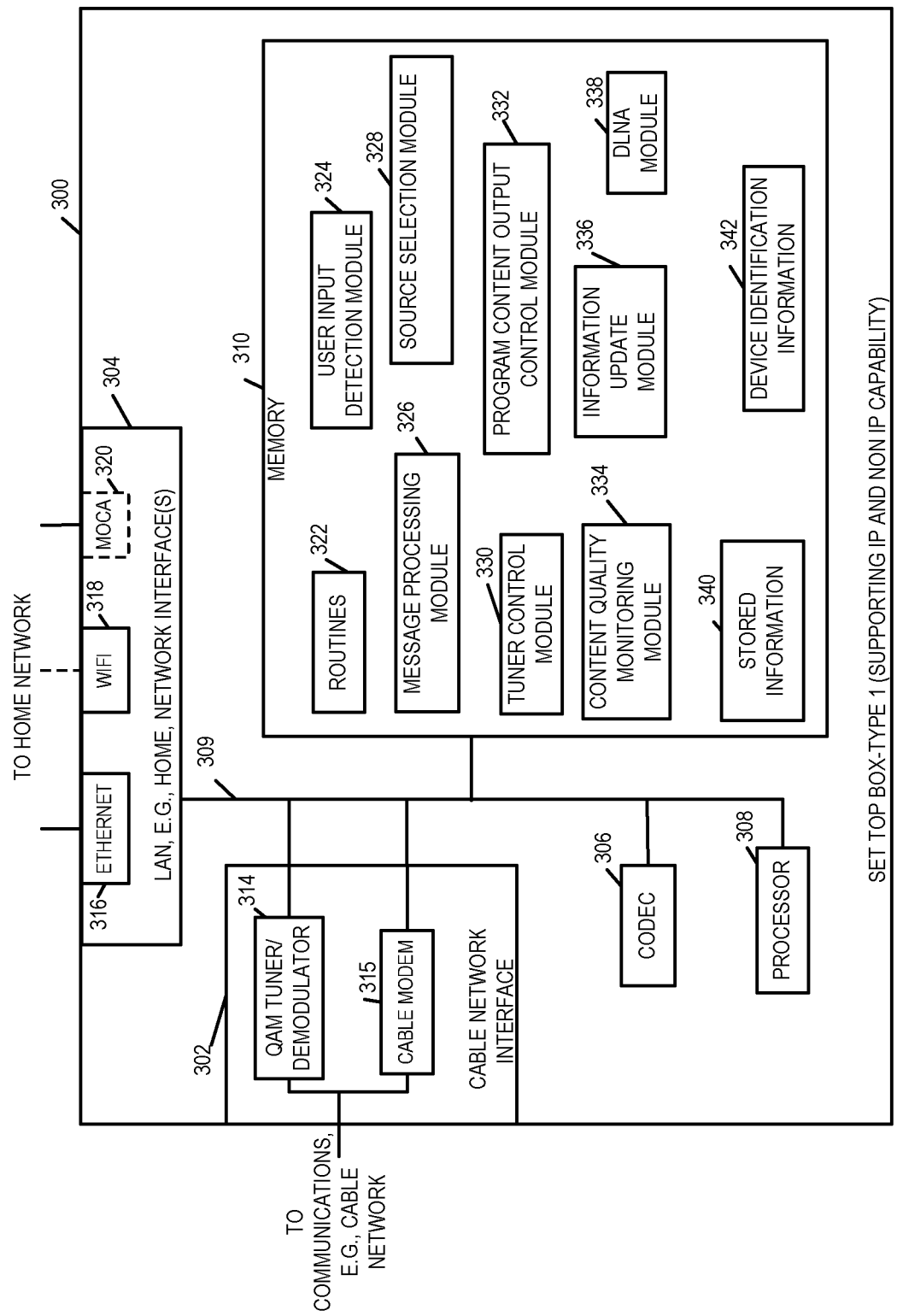
FIG. 3 illustrates an exemplary content playback device, e.g., a set top box, of a first type implemented in accordance with one exemplary embodiment.

FIG. 3 illustrates an exemplary content playback device 300, e.g., a set top box, of a first type implemented in accordance with one exemplary embodiment. The set top box 300 may be used in any one of the customer premises shown in FIG. 1. The content playback device 300 may be, and in some embodiments is, coupled to a display device, e.g. a monitor and/or a Television (TV). As discussed below in detail the STB 300 of the first type supports both IP and non-IP capability, that is, the STB 300 of the first type can communicate with external devices over IP as well as using standard QAM based communications channels. The STB 300 includes a cable network interface 302, a local area, e.g., home, network interface 304, a codec (Coder/Decoder) 306, a processor 308, and a memory 310 coupled together via a bus 309. The various elements of the content playback device 300 can exchange data and information over the bus 309.

Via the cable network interface 302, the STB 300 can exchange signals and/or information with other devices and/or system elements such as the servers in the network headend 102, over the communications network 110. Thus the cable network interface 302 supports the receipt and/or transmission of content, application data and/or other information from/to different servers, e.g., the BFS, SDV server, etc. The cable network interface 302 includes a QAM tuner/demodulator 314. The QAM tuner/demodulator 314 receives programming content from a channel to which the STB device 300 tunes and demodulates the received content and/or information. The cable network interface 302 further includes a cable modem 315 which supports receiving IP content packets communicated from an IP content server, e.g., IP content server 108. Thus it should be appreciated that the elements of the cable network interface 302 allows the STB 300 to support communications using standard QAM based communications channels as well as over IP. In some embodiments the interface 302 also includes, e.g., an infrared signal receiver to receive signals from a user remote control device. Thus in some embodiments the interface 302 may include, in addition to a cable network interface, an IR or radio interface for receiving signals from a remote control device.

Via the LAN, e.g., home, interface 304 the STB 300 can exchange signals and/or information with other various customer premise equipments such as the gateway device 200 illustrated in FIG. 2. The LAN interface 304 supports the receipt and/or transmission of content, and/or other information over a local home network, e.g., Ethernet, wireless and/or MoCA etc., from/to the gateway device 200. For example in some embodiments a portion of program content is supplied by the gateway device 200 to the content playback device 300 over a home network via the home network interface 304 in accordance with the features of various embodiments of the invention. The LAN interface 304 includes an Ethernet interface 316, an integrated WiFi modem 318 and an optional MoCA interface 320. Each individual interface in the LAN interface 304 in some embodiments includes a receiver and a transmitter and provides an interface to the LAN (e.g., home) network.

The codec 306 is a coder/decoder that can be and is used for encoding messages to be transmitted and decoding received messages which are encoded. In some embodiments the encoder/decoder also performs the function of decrypting received information that is encrypted. The processor 308, e.g., a CPU, executes routines 322 and one or more modules and controls the playback device 300 to operate in accordance with the invention. The processor 308 is responsible for controlling the general operation of the device 300 including, e.g., presentation of information and/or programs for display. To control the device 300, the processor 308 uses information, various modules and/or routines including instructions stored in memory 310.

In addition to the routines 322, the memory 310 includes a user input detection module 324, a message processing module 326, a source selection module 328, a tuner control module 330, a program content output control module 332, a content quality monitoring module 334, a communications module 335, an information update module 336, a DLNA module 338, stored information 340 and device identification information 342. The bus 309 allows the communication and exchange of information between and among the processor 308, the codec 306, the interfaces 302, 304 and the memory 310 which are coupled to the bus 309.

Routines 322 include communications routines and/or device control routines. User input detection module 324 detects a user input, e.g., input from a user received by the device 300. The user input may be sent by a control device such as a remote control, or by other means, e.g., selecting an option by pressing a button on the device or icon on a touch screen etc. User input signals from a remote control may be received via interface 302. The user input detection module 324 determines, on receipt of an input, e.g., a control signal providing user input, what type of selection has been made by the user, e.g., a channel selection instructing to tune to a specific channel, a program guide selection, or another input.

The message processing module 326 is configured to process various messages and/or signals received by the STB 300, e.g., via the interfaces 302, 304. The received messages and/or signals include messages, instructions and/or other signals received from headend 102 and from the gateway device, e.g., gateway 200. The message processing module 326 is further configured to update stored information 340 when a received message includes information indicating a change or an update. For example in some embodiments the message processing module 326 receives content source information from the headend 102 indicating a first source of content corresponding to a first program and a second source indicating a second source of content corresponding to the first program. In some embodiments the content source information indicates the name of the source, tuning parameters such as frequency corresponding to a channel for obtaining the content and/or URL of the content source. The STB 300 processes the received messages and provides information to the processor 308 and/or one or more other modules to take further action in response to the received messages.

The source selection module 328 is configured to select, from a plurality of possible content sources supplying content corresponding to a program, i) a primary content source for obtaining program content corresponding to the program, ii) a secondary content source for obtaining program content corresponding to the program, and iii) a tertiary content source for obtaining program content corresponding to the program. In various embodiments the source selection module 328 performs the selection based on one or more factors, e.g., content source information received from the headend 102 and/or IP content server 108, an instruction from the network control server specifying which content source to use as the primary source for a given program etc.

The tuner control module 330 is configured to control the tuner/demodulator 314 to tune to a frequency corresponding to a program channel to be viewed. This may be a user selected channel or, a channel to be tuned to when instructed by a server in the headend 102. The tuning parameters, e.g., frequency corresponding to a program channel, are indicated in the content source information.

The program content output control module 332 is configured to control the presentation and playback of program content from the playback device 300 to the user, e.g., on a display device. The content quality monitoring module 334 is configured to monitor the quality of received program content and determine if the quality of received content corresponding to a program falls below a predetermined threshold. In some embodiments the content quality monitoring module 334 is further configured to monitor to detect a failure to receive program content from a content source, e.g., primary content source. In some embodiments when the quality of the content received from the primary content source is not acceptable, the content quality monitoring module 334 is configured to send a control signal to the source selection module 328 to switch to (e.g., select for supplying content) the content source selected to be the secondary content source. In some embodiments when a failure to receive content from the primary content source is detected the content quality monitoring module 334 is configured to send a control signal to the source selection module 328 to switch to the content source selected to be the secondary content source. Thus the source selection module 328 is further configured to switch to the content source selected to be the secondary content source when it is determined that the quality of the content received from the primary content source is not acceptable and/or a failure is detected in receiving content from the primary content source. In some embodiments the source selection module 328 is further configured to set the one of the first and second content sources to which the switch is made, to be the primary content source and the other one of the first and second content sources to be the secondary content source.

The communications module 335 is configured to communicate to a network control device, e.g., control server 126, information indicating difficulty in receiving content from the primary content source. Thus in some embodiments the STB 300 uses the communications module 335 to report problems and/or difficulty in receiving content from a selected source.

The information update module 336 is configured to update the content source information stored in the memory as part of the stored information 340, e.g., when there is a change/switch of the content source selected as the primary content source in response to the quality monitoring module 334 detecting a failure to receive content and/or a unacceptable received content quality. Thus when the content source selected as the primary content source is changed and another content source, e.g., a secondary or tertiary source, becomes the primary content source, the update module 336 updates the stored information 340 to reflect the change. The DLNA module 338 contains programming instructions that enable the content playback device 300 to be a DLNA client. The DLNA module 338 also performs DLNA related decryptions.

The stored information 340 includes content source information, service related information, received content quality measurement information etc. The device identification information 342 may include, e.g., Media Access Control (MAC) address of the playback device 300 or some other identifier identifying the playback device 300. In some embodiments, one or more of the various modules discussed above work in coordination, e.g., with operations being merged to perform a function, to produce a desired output in accordance with the exemplary methods of the invention.

Figure 4:
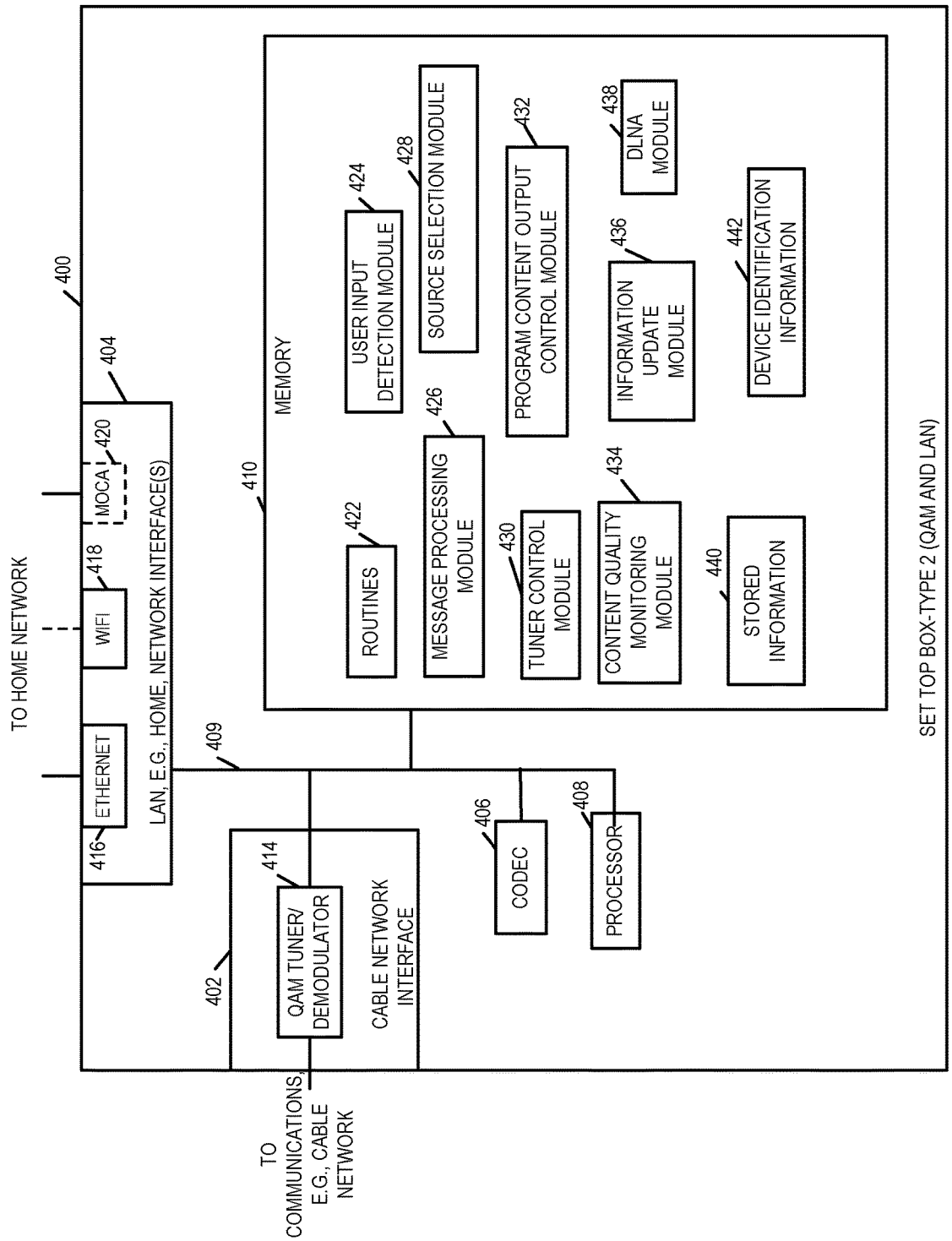
FIG. 4 illustrates an exemplary content playback device, e.g., a set top box, of a second type implemented in accordance with an exemplary embodiment.

FIG. 4 illustrates an exemplary content playback device 400, e.g., a set top box, of a second type implemented in accordance with one exemplary embodiment. The set top box 400 may be used in any one of the customer premises shown in FIG. 1. The content playback device 400 may be, and in some embodiments is, coupled to a display device, e.g. a monitor and/or a Television (TV). The STB 400 of the second type can communicate with external devices, e.g., located external to the customer premise, using standard QAM based communications channels but does not include a cable modem interface to receive IP packet stream from the service provider's IP content server 108.

The STB 400 includes a cable network interface 402, a local area, e.g., home, network interface 404, a codec (Coder/Decoder) 406, a processor 408, and a memory 410 coupled together via a bus 409. The various elements of the content playback device 400 can exchange data and information over the bus 409.

In addition to the routines 422, the memory 410 includes a user input detection module 424, a message processing module 426, a source selection module 428, a tuner control module 430, a program content output control module 432, a content quality monitoring module 434, a communications module 435, an information update module 436, a DLNA module 438, stored information 440 and device identification information 442.

Via the cable network interface 402, the STB 400 can exchange signals and/or information with other devices and/or system elements such as the servers in the network headend 102, over the communications network 110. Thus the cable network interface 302 supports the receipt and/or transmission of content, application data and/or other information from/to different servers, e.g., the BFS, SDV server, etc. In contrast to the STB 300 of the first type, the cable network interface 402 of the STB 400 does not include a cable modem. Thus receiving of packetized IP content from an external server via the cable network interface 402 is not supported by the second type STB 400. The cable network interface 402 includes a QAM tuner/demodulator 414 which works and performs functions in a similar manner as discussed with regard to the QAM tuner/demodulator 314 of STB 300. In some embodiments the interface 402 also includes, e.g., an infrared signal receiver to receive signals from a user remote control device.

Various other elements shown in the STB 400 perform same or similar functions as the like elements of STB 300 which have been discussed in detail. For example modules 424, 426, 428, 430, 432, 434, 435, 436, 438 perform the same or similar functions as the modules 324, 326, 328, 330, 332, 334, 335, 336, 338 discussed with regard to FIG. 3. Thus to avoid repetition, only the elements which are different or include different components within such as, e.g., the cable network interface 402, are discussed to highlight the differences. The LAN interface 404, codec 406, processor 408 and the various modules included in the memory 410 perform the same or similar functions as discussed with regard to STB 300 and thus will not be discussed in detail again. The stored information 440 includes content source information, service related information, received content quality measurement information etc. The device identification information 442 may include, e.g., Media Access Control (MAC) address of the playback device 400 or some other identifier identifying the playback device 400.

Figure 5:
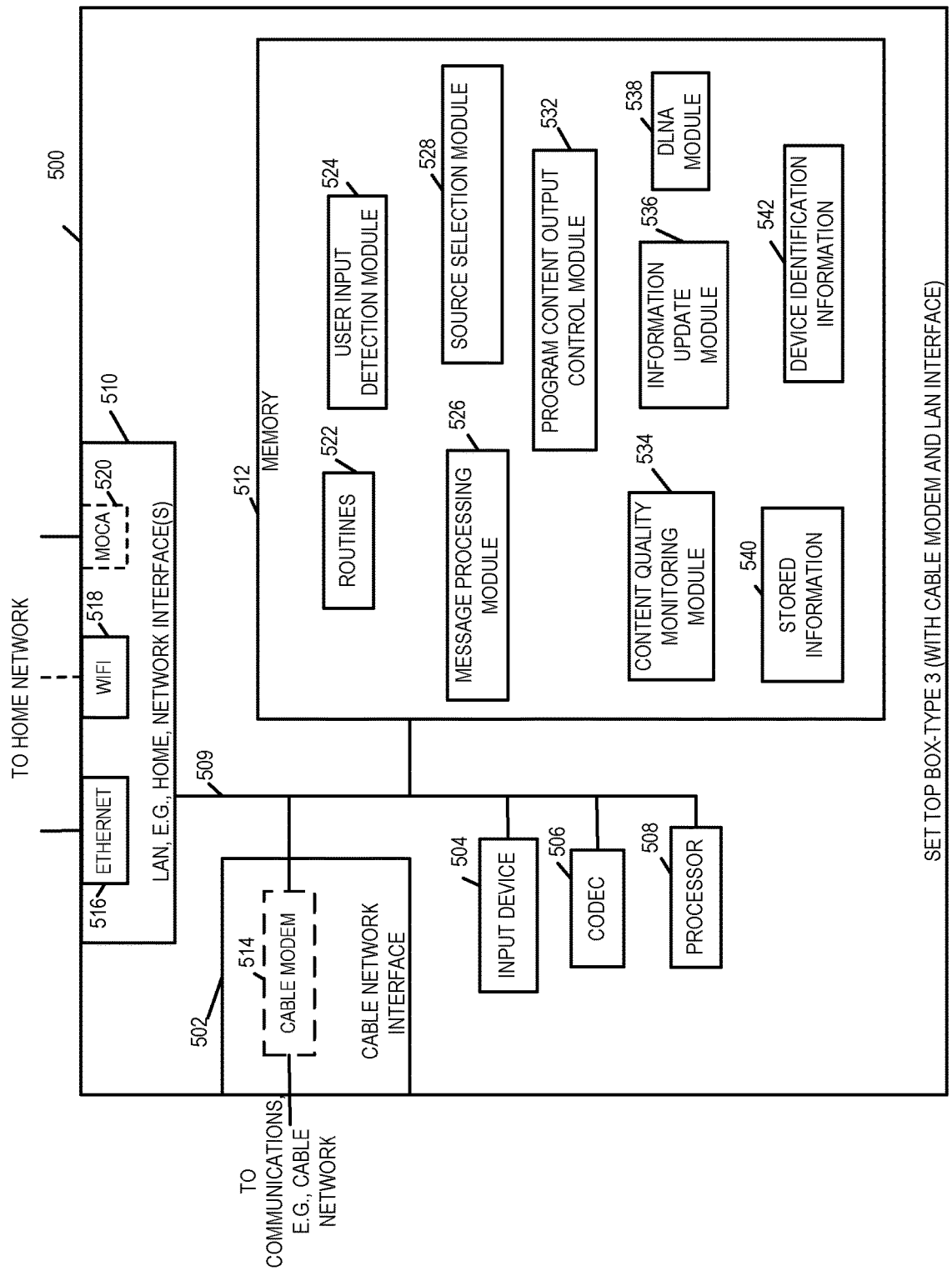
FIG. 5 illustrates an exemplary content playback device, e.g., a set top box, of a third type implemented in accordance with an exemplary embodiment.

FIG. 5 illustrates an exemplary content playback device 500, e.g., a set top box, of a third type implemented in accordance with one exemplary embodiment. The set top box 500 may be used in any one of the customer premises shown in FIG. 1. The content playback device 500 may be, and in some embodiments is, coupled to a display device, e.g. a monitor and/or a Television (TV). The STB 500 of the third type can communicate with external devices, e.g., located external to the customer premise, over IP using an optional cable modem included in an interface. However the STB 500 of the third type does not support communications with external devices using standard QAM based communications channels.

The STB 500 includes a cable network interface 502, a local area, e.g., home, network interface 504, a codec (Coder/Decoder) 506, a processor 508, and a memory 510 coupled together via a bus 509. The various elements of the content playback device 500 can exchange data and information over the bus 509.

In addition to the routines 522, the memory 510 includes a user input detection module 524, a message processing module 526, a source selection module 528, a program content output control module 532, a content quality monitoring module 534, a communications module 435, an information update module 536, a DLNA module 538, stored information 540 and device identification information 542.

Via the cable network interface 502, the STB 500 can exchange signals and/or information with other devices and/or system elements such as the IP content server 108, over the communications network 110. Thus the cable network interface 502 supports the receipt and/or transmission of content, application data and/or other information from/to external devices and servers. In contrast to the cable network interface of STBs 300 and 400, the cable network interface 502 of the STB 500 does not include a QAM tuner/demodulator. Thus receiving of content over QAM channels from an external server via the cable network interface 502 is not supported by the STB 500 of third type.

The cable modem 512 included in the cable network interface 502 facilitates bidirectional communications with external devices, e.g., IP content server 108, using IP over the communications network 110. In some embodiments the interface 502 also includes, e.g., an infrared signal receiver to receive signals from a user remote control device.

Various other elements shown in the STB 500 perform same or similar functions as the like elements of STB 300 which have been discussed in detail. Elements in FIG. 5 which are the same or similar to those of FIG. 3 are identified using reference which start with a 5 instead of a 3 but with the last two digits being the same. Thus to avoid repetition, only the elements which are different such as, e.g., the cable network interface 502, are discussed to highlight the differences. The LAN interface 504, codec 506, processor 508 and the various modules included in the memory 510 perform the same or similar functions as discussed with regard to STB 300 and thus will not be discussed in detail again. In addition to the cable network interface 502 being different, another difference that can be appreciated from FIG. 5 is that unlike STBs 300, 400, memory 510 of STB 500 does not include a tuner control module. This is due to the fact that STB 500 lacks a QAM tuner/demodulator in the cable network interface 502 and thus a tuner control module for controlling is not needed.

The stored information 540 includes content source information, service related information, received content quality measurement information etc. The device identification information 542 may include, e.g., Media Access Control (MAC) address of the playback device 500 or some other identifier identifying the playback device 500.

Figure 6:
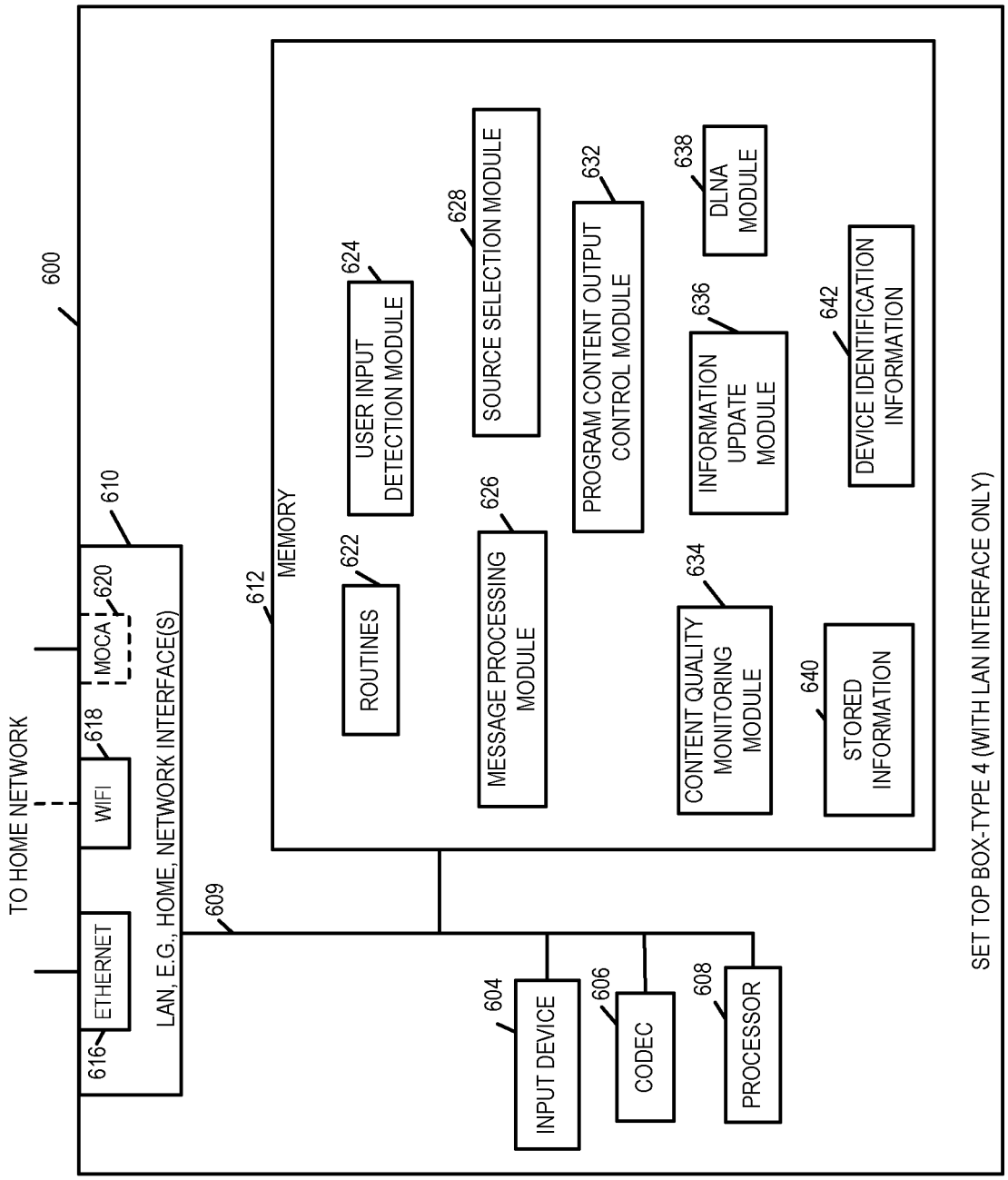
FIG. 6 illustrates an exemplary content playback device, e.g., a set top box, of a fourth type implemented in accordance with an exemplary embodiment.

FIG. 6 illustrates a set top box 600 which is similar to the set top box of FIG. 5 but without the cable network interface. Elements in FIG. 6 which are the same or similar to those of FIG. 5 are identified using reference which start with a 6 instead of a 5 but with the last two digits being used to identify a device/element with the same or similar functionally as the element shown in FIG. 5 having the same last two digits. Given the similarity of the elements shown in FIG. 6 to those shown in FIG. 5 the elements of FIG. 6 will not be described further.

Figure 7:
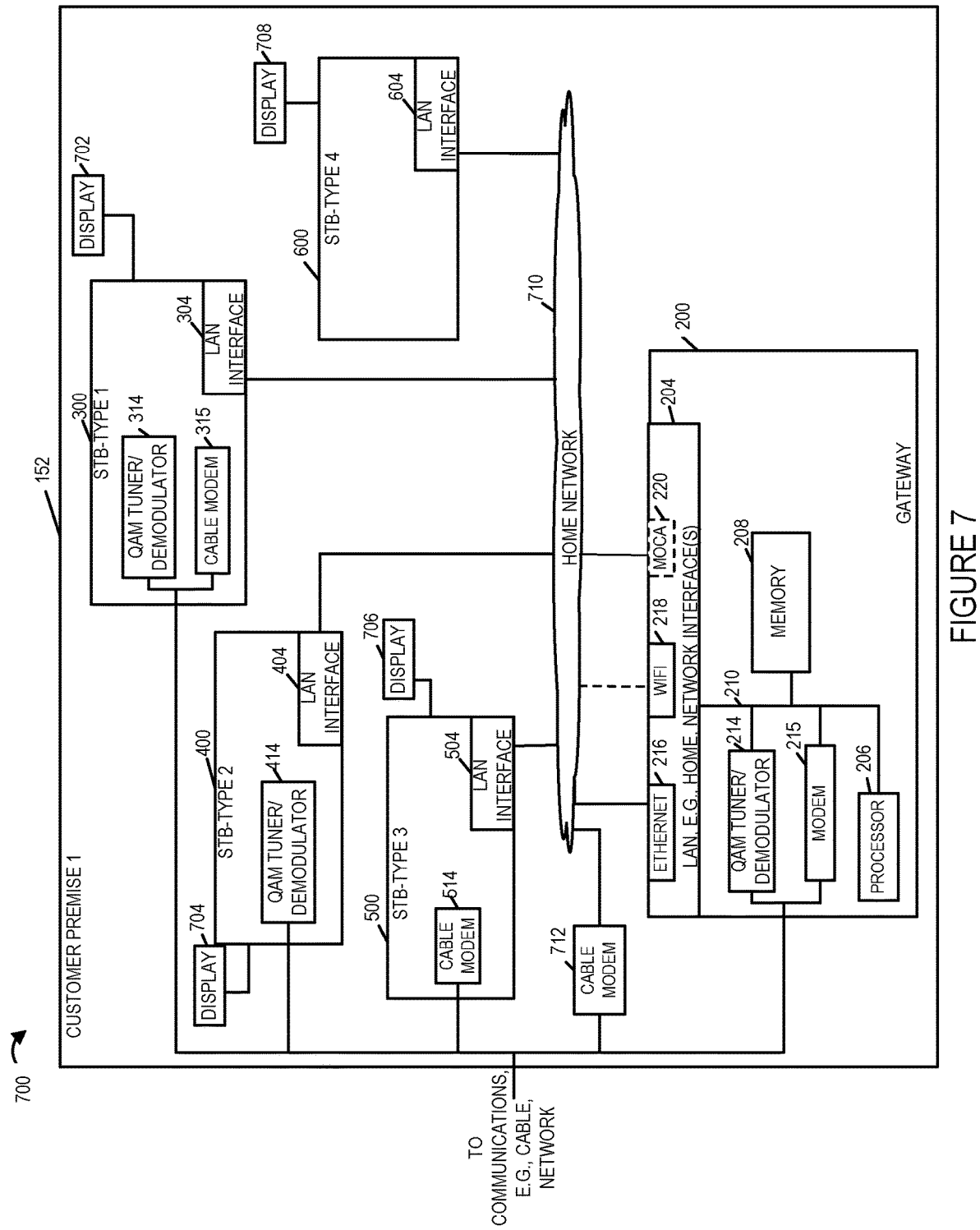
FIG. 7 illustrates some details of exemplary customer premise in accordance with one embodiment of the present invention.

FIG. 7 is a drawing 700 illustrating a customer premise, e.g., customer premise 1 152 shown in FIG. 1, including a gateway device 200 and four different types of set top boxes 300, 400, 500, 600 of the types previously described in regard to FIGS. 2-6. FIG. 7 is intended to show that a wide variety of devices and set top boxes may exist at a single customer premise where the devices may be coupled together by a home network 132. The various types of devices and the presence of a gateway 300 in addition to a cable modem 712 provide multiple alternative ways in which individual set top boxes may receive content either from the IP server 108, directly from the servers 120, 122, 123 of the headend 102 or from the gateway device 300 over the home network as an IP packet stream after the gateway device 200 transcodes content received over a non-IP cable channel.

Figure 8B:
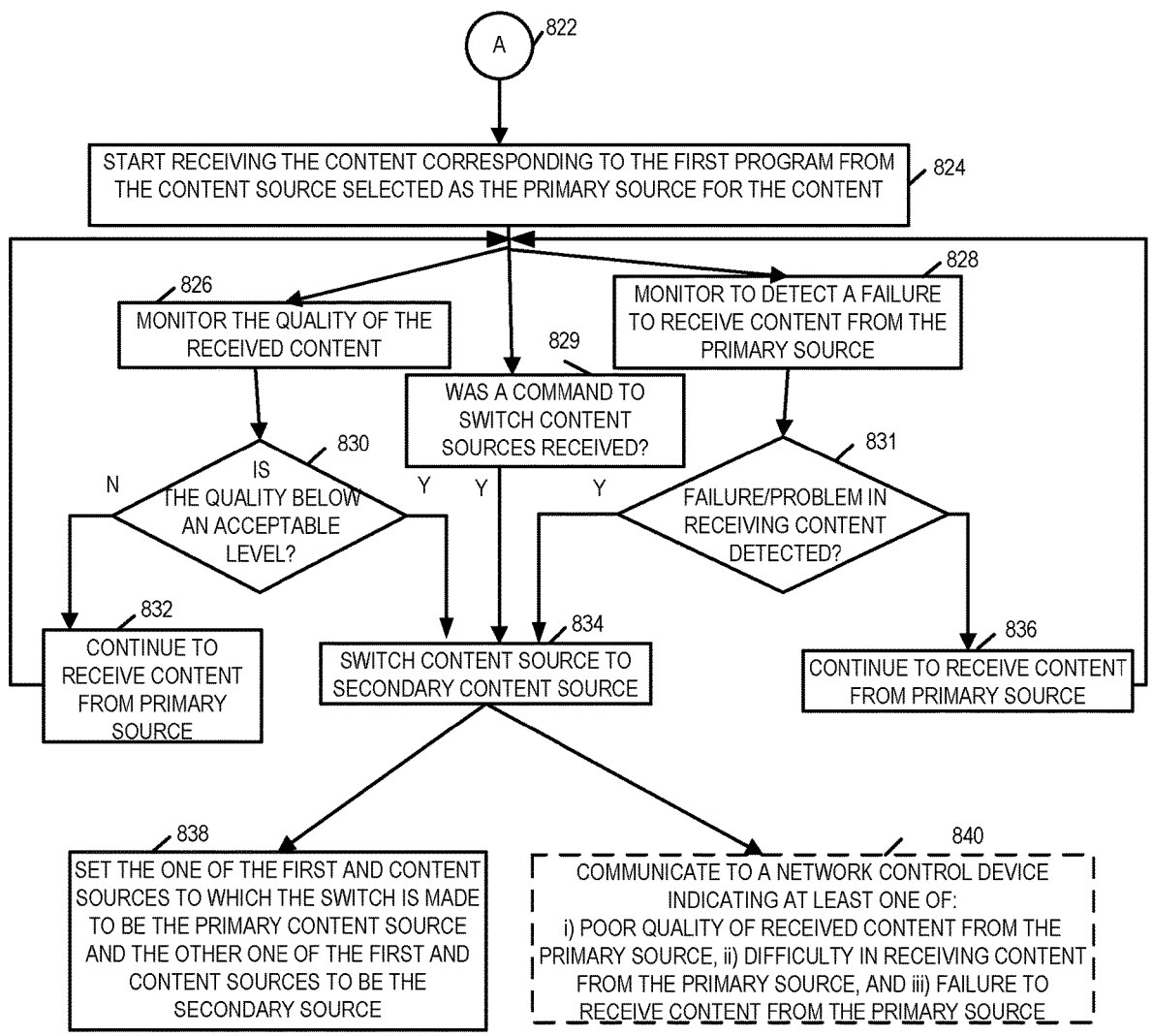
FIG. 8 illustrates an exemplary flow chart showing the steps of an exemplary method implemented by an apparatus in accordance with one exemplary embodiment of the invention.

FIG. 8 illustrates the steps of an exemplary method 800 implemented by an apparatus, e.g., a set top box, in accordance with one exemplary embodiment. The set top box maybe, e.g., one of the set top boxes 300, 400, 500 or 600 shown in FIG. 7.

The method starts in step 802, e.g., with the set top box being powered on. Operation proceeds from start step 802 to receive step 804 in which content source information is received. The content source information may be received as part of a program guide, broadcast service information and/or from a combination of sources depending on the source of content available to the set top box implementing the method. The received information maybe, e.g., information about programs available on various QAM channels corresponding to the broadcast server 120, SDV channels corresponding to the SDV server 122 or programs available from the IP capable content server 108. In the case of programs available from a gateway device the content information may also include information on what programs are available from the gateway device 200 via the home network 710 in the case where the gateway device supports transcoding and IP packetization. Is should be appreciated that a set top box may have an option of selecting between a variety of content sources where one of the sources many be a non-IP QAM channel and another maybe a IP content source located either in the network outside a customer premise, e.g., content server 108 or at the customer premise, e.g., gateway device 200.

Steps 806, 808 and 810 may and sometimes are performed as part of step 804. In step 806 first information indicating a first source of content corresponding to a first program is received. For example information may be received indicating that the BFS 120 will broadcast the first program on a QAM channel that can be received and demodulated by a set top box, e.g. STB 300, including a tuner/demodulator and a connection to the cable network. Then in step 808 second information indicating a second source of content corresponding to the first program is received. The second source may be IP content server 108 which may publish a URL which can be used by STB 300 to obtain the content from the IP content server, e.g., via cable modem 315 or a cable mode 712 connected to the home network 710. In optional step 810 third information indicating a third source of content corresponding to the first program is received. The third source of content may be gateway device 200 which may receive the first program via the QAM channel on which it is broadcast or from the IP content server and which can then stream the content in the form of IP packets to the set top box 300 via the home network 710 and LAN interface 304 included in STB 300.

While receipt of information indicating multiple available sources of the first program is received in step 804 it should be appreciated that similar information may be received for each program in a program guide. In some embodiments a server providing program and/or service information provides a single file to the STB 300 indicating the multiple alternative sources of each of a plurality of individual programs available to it. In other embodiments the set top box 300 receives program and source information corresponding to different sources separately and correlates the received information to identify the different available sources for each piece of content, e.g., for each program available to the STB 300.

Operation proceeds from step 804 to step 812 in which the information regarding available sources, e.g., including in many cases multiple alternative sources, of content is stored in memory.

In optional step 814 the set top box 300 receives a message from a network control device, e.g., network control server 126, specifying which source of content is to be used as the primary source of content for the first program. The message may be a general message indicating that the set top box 300 should use the BFS or an SDV channel as the source of content whenever possible or in the form of a particular message indicating that IP content server 108 be used for a particular program or for programs which normally would be obtainable from a particular set of BFS or SDV channels. Such a message may be sent in response to planned network services affecting a particular channel or program broadcast, in response to another set top box in the same region as set top box 300 reporting a problem with a channel or program or as part of a roll out of a new service where some programs or service not be available from the servers in the headend 102 but can be obtained from the IP content server 108.

In optional step 816 the information included in a message received in step 814 is stored for future use in selecting a content source to be used. Operation proceeds from step 816 to step 818. If optional steps 814 and 816 are skipped or not performed operation proceeds directly from step 812 to step 818.

In step 818 the set top box 300 implementing the method selects one of the available content sources to use as a primary source for obtaining content corresponding to the first program. The selected primary source will be referred to as a first source. The STB 300 also selects a secondary source to be used for obtaining the content in the event there is a problem with receiving content from the primary source. The selection of the primary source performed in step 818 may be based on information that was included in a received message. For example, as indicated in sub step 820, step 818 may include selecting as the primary source for content corresponding to the first program the source specified in the message received in step 814.

Operation proceeds from step 818 to step 824 via connecting node 822. In step 824 the STB 300 starts receiving content corresponding to the first program from the content source selected as the primary source for the first program content. Operation then proceeds to monitoring steps 826, 829, and 828 which occur in parallel, e.g., during the receipt, processing and output of content corresponding to the first program.

In step 826 the quality of the received content is monitored. The monitoring may involve the detection of missing packets, missing frames, data rate, etc, which are indicators of the quality of the content corresponding to the first program which is being received. In step 830 a determination is made to whether the quality of the received first program content is below a threshold level, e.g., a quality level threshold which is considered acceptable to a view who views content output by the set top box 300. If the quality of the content is not below the minimum acceptable quality threshold, operation proceeds to step 832 where content is continued to be received from the primary source. Operation is shown proceeding from step 832 to steps 826 and 828 to show that the quality of received content is performed on an ongoing basis.

In step 829 the STB 300 monitors for a command to switch from the content source it is using to receive the first program to another content source. Such a command may be issued by the control server 126 based on planned network service, reported network issues or because a service roll out has reached a stage where the program can now be provided via a more efficient mechanism, e.g., a BFS server using a QAM channel rather than via the IP content server. If a command is received in step 129 operation proceeds to step 834 with the switch being made to the content source indicated in the received command message.

In step 828 the STB 300 monitors to detect a failure to receive content corresponding to the first program from the primary source. The failure may be the result of a network failure which may not interfere with content delivery form the secondary source, e.g., the IP content server 108.

In step 831, a check is made to determine if the monitoring detects a network failure or a problem in receiving content. If a network failure or problem is detected in step 831 operation proceeds to step 834 otherwise operation proceeds to step 836 and the content continues to be received via the primary content source.

In step 834 a switch is made from the primary content source, e.g., a non-IP QAM channel, to the secondary content source, e.g., an IP content source such as IP server 108. Then in step 838 the STB 300 updates its memory to reflect that what was the secondary content source has become the primary content source and that the source which was a primary source should now be treated as a back up or secondary content source. In optional step 840 a message may be sent to the network control device indicating the switch from one content source to another and, optionally the reason for the switch, e.g., poor quality of a received signal, difficulty in receiving content and/or the complete failure to receive content. The control server may, and sometime does, use the information in such a message to detect network faults and/or make a decision as to which, if any, other set top boxes in the same region as the set top box which reported the switch between content sources should be instructed to switch content sources with regard to the first program and/or other programs which may be delivered using the same hardware as the first program.

While a switch between content sources may occur during presentation of a program by the STB, the view may be relatively unaffected since the switch between content sources may occur quickly and with little or no disruption.

While described in the context of a cable network system it should be appreciated that the methods are also particularly well suited for use with over the air and satellite transmissions. The broadcast transmission which can be received over the wireless communication channel, e.g., over the air or via satellite are treated as the primary source with a landline, fiber optic or cable connection being used to receive content when the over the air broadcasts or satellite transmission become unacceptable or unavailable. As part of such a system a program may begin being viewed as it is received over the air with the end portion of the program being delivered over a cable or fiber optic network after the set top box determines that the over the air signal quality is unacceptable or the content can not be received via the over the air channel. The set top box may send a request to the IP content server signaling its place within a program at the time the program was lost or signal quality dropped below an acceptable threshold with the IP content server delivering content from that point in the program but not necessarily from the start of the program.

In general, the methods and apparatus can be used with a wide variety of different content sources which may supply the same program content but in different coding formats, at different data rates and/or via different delivery networks or portions of networks. The methods and apparatus are well suited in systems where the same programming content is available from multiple sources, e.g., a legacy content delivery network or legacy content server such as a broadcast server which supplies content delivered using a QAM communications channel and a more modern type of content source such as a unicast IP server which streams programming content to individual devices. In some embodiments the first source of first program content is a broadcast content source and second source of the first program content is an on-demand or unicast content source. Thus, a STB can receive content corresponding to the first program from either source. In other embodiments the different sources may both be broadcast or unicast sources but with the program content being supplied by different devices, e.g., servers, which supply the program content in different formats and/or at different data rates. In at least some such embodiments the different sources, e.g., servers, are coupled to the receiving device via at least some portions of a delivery network which do not overlap or via different delivery networks altogether. For example, in at least one embodiment a satellite source is used as a primary source of program content but in the event of a failure in receipt of content from the broadcast satellite source the receiver switches to a land based content source, e.g., a unicast IP server, which supplies content corresponding to the same program that was being delivered by satellite broadcast that was received prior to a problem with satellite reception.

It should be appreciated that primary and secondary sources of a program may be channels, e.g., QAM (Quadrature Amplitude Modulated) channels which are tuned to, received, demodulated and when received in encoded format, decoded, and/or IP delivery channels including unicast or broadcast channels and/or a wide variety of other sources of program content. In embodiments including a QAM source, e.g., QAM channel and/or broadcast file server, the receiver device normally include a tuner circuit, coupled or combined with a demodulator circuit and a decoder circuit. While such QAM delivery embodiments are supported, it should be appreciated that the methods and apparatus of the present invention are not limited to QAM channel based content delivery methods and often involve use of a QAM channel as a primary program source and a different type of source, e.g., an IP channel or unicast IP stream, as a secondary source which can be used to receive content corresponding to the same program normally available from the primary source. In some embodiments program guide information is distributed to set top boxes and/or other receiver apparatus such as televisions which indicates multiple content sources, e.g., a QAM channel and an IP channel or server, which can be used to obtain the same program content albeit often in different coding formats and/or at different data rates. Thus, the methods and apparatus facilitate not only the switching between primary and secondary sources but support and/or include the dissemination of information which notifies devices of multiple alternative sources for the same program content, e.g., movie or television program. In some embodiments program guide information indicate two or more, e.g., three, alternative sources for content corresponding to the majority of programs listed in the program guide which is distributed. For example, a program guide listing 50 programs may indicate two sources for 40 of the 50 listed programs with 3 or more sources listed for multiple programs in some embodiments. In some embodiments multiple IP sources are listed for each program. In other embodiments at least an IP source and a non-IP source, e.g., QAM channel, is indicated for the majority of the programs listed in the guide. In some embodiments when a program guide is displayed, the multiple alternative sources of each program are displayed and a user is allowed to select and thereby indicate to the set top box or receiver which source is to be used as the primary source and which other source is to be used as a secondary or even third source for the program that the user selects to display. In some embodiments at least one of the two sources for a program is a broadcast content source, such as a broadcast file server, terrestrial or satellite radio transmitter or channel and the second source is a unicast content source such as an IP content source which supplied a unicast IP content stream including program content to the STB or receiver in response to a request for such content. As should be appreciated the transmitters and/or portions of a content delivery network corresponding to the different sources of a program indicated in the program guide information will normally be different. In some embodiments where a default source has been set by a user or a network element, program guide information for only the default program source is displayed in the program guide which is displayed to a user. In such embodiments, the displayed program guide is not cluttered with showing the alternative sources, e.g., channels and/or servers, for a program which may be selected by a user. In one such embodiment the set top box or receiver will use the default source when possible in response to user selection of a program from a displayed program guide.

In some embodiments the primary and secondary sources are both IP channel sources but located at different sites and thus correspond to different portions of a network. The IP program channels may be implemented as broadcast, e.g., multicast channels or as unicast channels. In the case of unicast channels the primary and secondary program channels, e.g., sources, are implemented as two separate unicast content streams which may be, and normally are, streamed from different servers and/or network locations. As should be appreciated, the unicast content streams may be received in a variety of ways and an IP STB or other receiver device implemented in accordance with the invention. In IP embodiments and various other embodiments the set top box or receiver may not, and in various embodiments does not, include QAM channel tuner and demodulator circuits. In embodiments using two unicast IP streams, e.g., as a primary program channel and a secondary program channel respectively, the IP streams may be received in a plurality of ways, e.g., one via a cable modem and another via a wireless receiver.

While the primary and secondary channels may be of the same type, e.g., program channels received over a QAM communications channel or channels, the primary and secondary program channels may correspond to different types of transport channels or networks. For example the primary program channel may be received via a QAM channel and the secondary program channel may be received via an IP based channel or network. For example, the methods may be used with a first content source being a legacy content source such as a QAM cable channel used to deliver content and the second soure being an IP content source, e.g., a unicast content source.

An exemplary method of operating a set top box, comprises: receiving first information indicating a first source of content corresponding to a first program; receiving second information indicating a second source of content corresponding to said first program; selecting a first one of said first source and said second source as a primary source to be used by said set top box to obtain content corresponding to said first program and a second one of said first source and said second source to be used as a secondary source of said content corresponding to a first program; and storing information in memory indicating which of said first and second sources should be used as the primary source of content corresponding to said first program.

In some embodiments the first source is a source which provides first program in a non-IP format, and the second source provides the first program content in an IP format.

In some embodiments the first information indicating a first source includes channel tuning information used for tuning to a QAM channel, and the second information indicating a second source includes a URL corresponding to said second source.

In some embodiments the first information indicating a first source includes a URL corresponding to a home gateway device which transcodes and packetizes content from a non-IP format to an IP packet format, and the second information indicating a second source includes a URL corresponding to a network source of IP packets communicating said first program, said network source of IP packets being a source located outside a home in which said home gateway device is located.

In some embodiments the method, further comprises: receiving content corresponding to the first program from the content source selected as the primary content source, monitoring the quality of the received content corresponding to the first program, determining if the quality of the received content is acceptable, and switching to the content source selected to be the secondary content source when it is determined that the quality of the content received from the primary content source is not acceptable.

In some embodiments the exemplary method, further comprises: monitoring to detect a failure to receive said content corresponding to the first program from the primary content source; and switching to the content source selected to be the secondary content source when failure to receive said content corresponding to the first program is detected.

In some embodiments the exemplary method, further comprises: setting the one of the first and second content sources to which the switch is made to be the primary content source and the other one of the first and second content sources to be the secondary content source.

In some embodiments the exemplary method, further comprises: communicating to a network control device information indicating difficulty in receiving content from the primary content source (e.g., identifier of STB, channel ID and program ID)

In some embodiments the exemplary method, further comprises receiving a message from the network control device specifying which one of said first content source and said second content source is to be used as the primary content source for said first program content. In some embodiments when the message is received prior to performing the step of selecting a first one of said first source and said second source as a primary source to be used by said set top box to obtain content corresponding to said first program, the method includes selecting the one of said first source and said second source indicated in said message as the primary source.

Numerous variations on the above described embodiments are possible.

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a media content distribution system. Various embodiments are also directed to methods, e.g., a method of controlling the distribution of media content, e.g., video on demand audio and/or video content. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method. In some embodiments devices, elements and/or modules that are configured to perform various functions are implemented as circuits, e.g., with a different circuit for each function being implemented in some but not necessarily all embodiments.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware, e.g., in circuitry, ASICs, ICs, etc. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A method of operating an apparatus located at a first customer premise, the method comprising:
   receiving first information indicating a first content source, said first content source being a broadcast content source;
   receiving second information indicating a second content source, said second content source being a video on demand (VOD) content source, said first and second content sources being different content sources from which content included in a first program can be obtained;
   determining from a received signal which one of said first content source and said second content source is to be used as a primary content source for content included in the first program, said received signal being from a control device located outside the first customer premise at which said apparatus is located; and
   storing information in memory indicating which one of said first content source and said second content source was determined to be the primary content source for content corresponding to said first program.

2. The method of claim 1,
   where said broadcast content source is a non-IP broadcast channel which provides first program content in a non-IP format;
   wherein said information stored in memory indicates the non-IP broadcast channel was determined to be the primary content source for content corresponding to said first program;
   wherein said received signal includes a message from said control device located outside the first customer premise;
   and
   wherein said second content source is a source which provides said first program content in an IP format.

3. The method of claim 2,
   wherein said first information indicating a first content source includes channel tuning information used for tuning to a QAM channel; and
   wherein said second information indicating a second content source includes a URL corresponding to said second content source.

4. The method of claim 2, further comprising:
   receiving said content corresponding to the first program from the content source indicated in memory to be the primary content source;
   monitoring the quality of the received content corresponding to the first program;
   determining if the quality of the received content is acceptable; and
   switching to a content source selected to be a secondary content source when it is determined that the quality of the content received from the primary content source is not acceptable.

5. The method of claim 4, further comprising:
   setting the one of the first and second content sources to which the switch is made to be the primary content source and the other one of the first and second content sources to be the secondary content source.

6. The method of claim 5, further comprising:
   monitoring to detect a failure to receive said content corresponding to the first program from the primary content source; and
   switching to the content source selected to be the secondary content source when failure to receive said content corresponding to the first program is detected.

7. The method of claim 6, further comprising:
   setting the one of the first and second content sources to which the switch is made to be the primary content source and the other one of the first and second content sources to be the secondary content source.

8. The method of claim 5,
   wherein said control device is a network control device, the method further comprising:
   communicating to said network control device information indicating difficulty in receiving content from the primary content source.

9. The method of claim 8, wherein said network control device is a server located outside the first customer premise at which said apparatus is located.

10. The method of claim 9,
    wherein when said message is received prior to performing a step of selecting a first one of said first content source and said second content source as a primary source to be used by a set top box to obtain content corresponding to said first program; and wherein the method further includes selecting the one of said first content source and said second content source indicated in said message as the primary content source.

11. The method of claim 1,
wherein said first information indicating a first content source includes a URL corresponding to a home gateway device which transcodes and packetizes content from a non-IP format to an IP packet format; and
wherein said second information indicating a second content source includes a URL corresponding to a network source of IP packets communicating said first program, said network source of IP packets being a source located outside a home in which said home gateway device is located.

12. The method of claim 1, wherein said received signal from a control device located outside the first customer premise is a signal communicating an instruction to use a broadcast content source as the primary content source.

13. The method of claim 1, wherein said received signal from a control device located outside the first customer premise is a signal communicating an instruction to use a broadcast content source as the primary content source whenever possible rather than an IP capable content server.

14. The method of claim 13, wherein the VOD content source is an IP capable content server.

15. The method of claim 1, wherein said received signal from a control device located outside the first customer premise is a signal communicating a general instruction to use a broadcast content source or a switched digital video content source whenever possible.

16. The method of claim 1,
wherein said apparatus located at said first customer premise device is a first content playback device; and
wherein said received signal from a control device located outside the first customer premise is a signal which is sent by said control device in response to a signal from a second content playback device which is a different content playback device than said first content playback device.

17. The method of claim 16, wherein said second content playback device is a content playback device which has content delivery equipment in common with the first customer premise device.

18. An apparatus located at a first customer premise for receiving and processing encoded content, the apparatus comprising:
an interface that i) receives first information indicating a first content source corresponding to a first program and second information indicating a second content source corresponding to said first program, said first content source being a broadcast content source, said second content source being a video on demand (VOD) content source, and ii) receives a signal, from a control device located outside the first customer premise at which said apparatus is located;
a processor that controls operation of said apparatus, said processor being configured to control the apparatus to determine from the received signal which one of said first content source and said second content source is to be used as a primary content source for content included in the first program; and
memory storing information indicating which one of said first content source and second content source was determined to be the primary content source for content corresponding to said first program.

19. The apparatus of claim 18,
where said broadcast content source is a non-IP broadcast channel which provides first program content in a non-IP format;
wherein said information stored in memory indicates the non-IP broadcast channel was determined to be the primary content source for content corresponding to said first program;
wherein said received signal includes a message from a control device located at a network headend which is outside said first customer premise where said apparatus is located;
wherein said apparatus is a set top box; and
wherein said second content source is a source which provides said first program content in an IP format.

20. The apparatus of claim 19,
wherein said first information indicating a first content source includes channel tuning information used for tuning to a QAM channel; and
wherein said second information indicating a second content source includes a URL corresponding to said second content source.

21. The apparatus of claim 19, wherein the processor controls the apparatus to:
monitor the quality of the received content corresponding to the first program and determine if the quality of the received content is acceptable; and
switch to a content source selected to be a secondary content source when it is determined that the quality of the content received from the primary content source is not acceptable.

22. The apparatus of claim 18,
wherein said first information indicating a first content source includes a URL corresponding to a home gateway device which transcodes and packetizes content from a non-IP format to an IP packet format; and
wherein said second information indicating a second content source includes a URL corresponding to a network source of IP packets communicating said first program, said network source of IP packets being a source located outside a home in which said home gateway device is located.

23. The apparatus of claim 18, wherein said received signal from a control device located outside the first customer premise is a signal communicating an instruction to use a broadcast content source as the primary content source.

24. The apparatus of claim 18, wherein said received signal from a control device located outside the first customer premise is a signal communicating an instruction to use a broadcast content source as the primary content source whenever possible rather than an IP capable content server.

25. The apparatus of claim 18, wherein said received signal from a control device located outside the first customer premise is a signal communicating a general instruction to use a broadcast content source or a switched digital video content source whenever possible.

26. The apparatus of claim 18,
wherein said apparatus located at said first customer premise is a first content playback device; and
wherein said received signal from a control device located outside the first customer premise is a signal which is sent by said control device in response to a signal from a second content playback device which is a different content playback device than said first content playback device.

* * * * *